United States Patent [19]
Watanabe et al.

[11] Patent Number: 5,723,775
[45] Date of Patent: Mar. 3, 1998

[54] ATOMIC FORCE MICROSCOPE UNDER HIGH SPEED FEEDBACK CONTROL

[75] Inventors: Shunji Watanabe, Tokyo; Toru Fujii, Takasaki, both of Japan

[73] Assignee: Nikon Corporation, Tokyo, Japan

[21] Appl. No.: 674,867

[22] Filed: Jul. 2, 1996

[30] Foreign Application Priority Data

Jul. 5, 1995 [JP] Japan ................................. 7-169392

[51] Int. Cl.$^6$ .............................. G01B 5/28; G01N 23/00
[52] U.S. Cl. ............................................................. 73/105
[58] Field of Search ................................. 73/105; 250/306

[56] References Cited

U.S. PATENT DOCUMENTS

| | | | |
|---|---|---|---|
| 5,168,159 | 12/1992 | Yagi | 250/306 |
| 5,210,410 | 5/1993 | Barrett | 250/234 |
| 5,267,471 | 12/1993 | Abraham et al. | 73/105 |
| 5,321,977 | 6/1994 | Clabes et al. | 73/105 |
| 5,436,448 | 7/1995 | Hosaka et al. | 250/306 |
| 5,440,121 | 8/1995 | Yasutake et al. | 250/306 |
| 5,481,908 | 1/1996 | Gamble | 73/105 |
| 5,503,010 | 4/1996 | Yamanaka | 73/105 |
| 5,507,179 | 4/1996 | Gamble et al. | 73/105 |
| 5,537,863 | 7/1996 | Fujiu et al. | 73/866.5 X |
| 5,559,330 | 9/1996 | Murashita | 250/306 |

FOREIGN PATENT DOCUMENTS 6-26807   2/1994   Japan .

OTHER PUBLICATIONS

AFM Imaging Modes, Topometrix Corporation, 1993, pp. 1–16.

Hobbs et al., "Atomic Force Microscope: Implementations", SPIE vol. 897 Scanning Microscopy Technologies and Applications, 1988, pp. 26–30.

Hues et al., "Scanning Probe Microscopy of Thin Films", MRS Bulletin, Jan. 1993, pp. 41–49.

Martin et al., "Atomic Force Microscope–Force Mapping and Profiling on a Sub 100–A Scale", J. Appl. Phys. vol. 61, No. 10, 15 May 1987, pp. 4723–4729.

Muramatsu et al., "Near–Field Optical Microscopy in Liquids", Appl. Phys. Lett., vol. 66, No. 24, 12 Jun. 1995, pp. 3245–3247.

*Primary Examiner*—Hezron E. Williams
*Assistant Examiner*—Daniel S. Larkin
*Attorney, Agent, or Firm*—Foley & Lardner

[57] ABSTRACT

An object of the invention is to enable high-speed feedback control by decreasing the mass of a cantilever including an axial driving actuator and eliminate drawbacks caused by the decrease in mass. In a so-called atomic force microscope for observing the surface shape of a sample using a signal corresponding to an interatomic force or the distance between a probe and the sample surface by bringing the probe of a cantilever to the vicinity of the sample surface held by a sample stage and performing two-dimensional scanning with the probe, a piezoelectric film sandwiched between a pair of electrodes is formed on the cantilever, and the piezoelectric film displaces the cantilever in a predetermined direction due to a $d_{31}$ inverse piezoelectric effect upon application of a signal voltage to the electrodes.

14 Claims, 10 Drawing Sheets

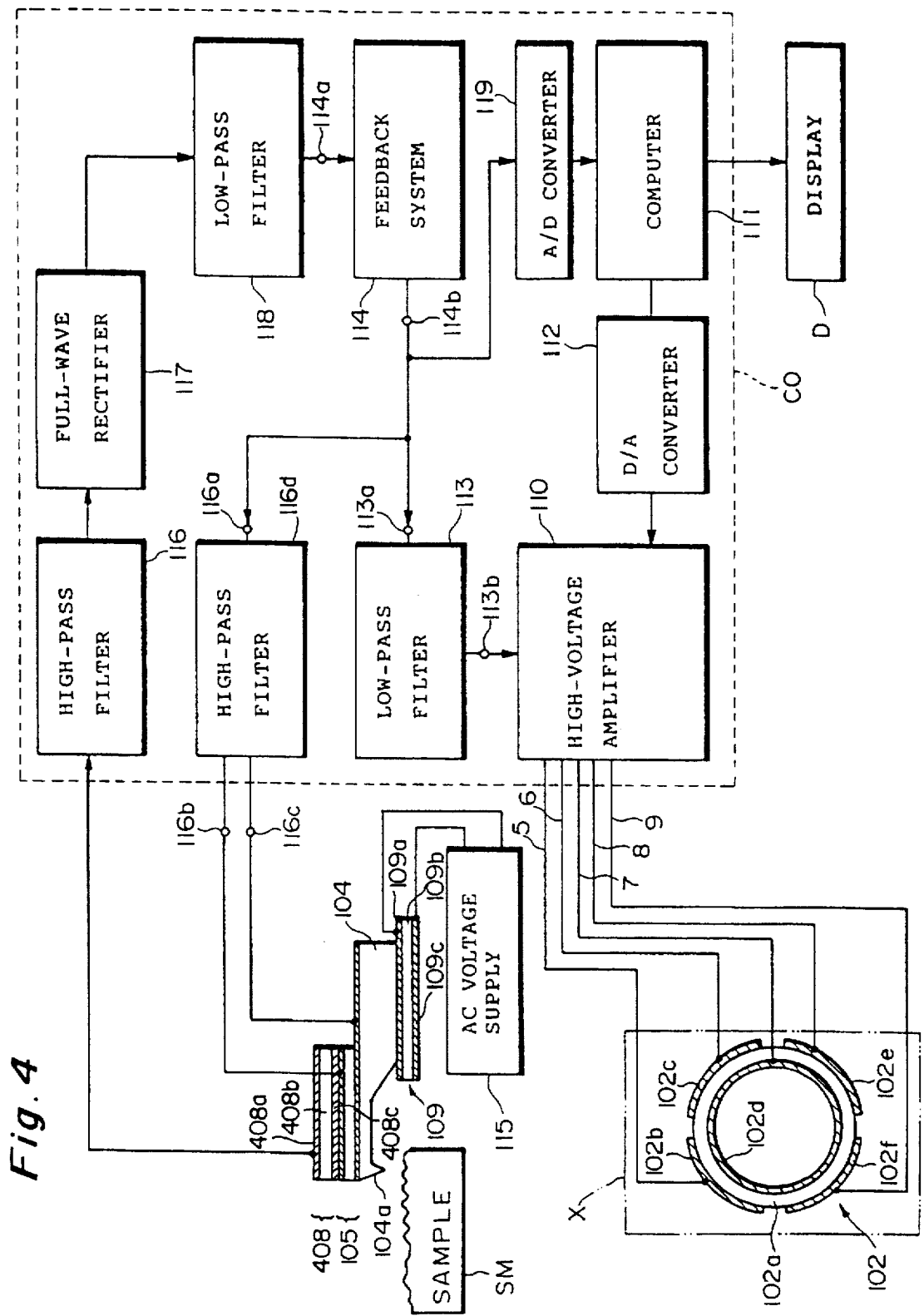

ATOMIC FORCE MICROSCOPE UNDER HIGH SPEED FEEDBACK CONTROL

BACKGROUND OF THE INVENTION

1. Field of the Invention

The present invention relates to an atomic force microscope usable for observing a fine surface shape.

2. Related Background Art

A scanning probe microscope such as atomic force microscope (AFM), scanning tunnelling microscope (STM), magnetic force microscope (MFM), friction force microscope (FFM), or near-field optical microscope (NFOM) is a microscope capable of observing a surface with a high resolution in nanometers or sub-nanometers, without damaging the surface to be observed, by scanning the surface using, as a feedback signal, a signal generated by the interaction between the surface to be observed and a probe while keeping the interval between the surface to be observed and the probe constant.

SUMMARY OF THE INVENTION

The surface shape of a sample is considered to be a shape obtained by synthesizing low-frequency and high-frequency components. The scanning probe microscope measures the surface shape by scanning the sample surface with a probe. In scanning, the probe is moved relative to the sample surface so as to trace the sample surface. The probe is moved by two piezoelectric actuators having difference masses. The actuator having a large mass moves the probe in correspondence with the low-frequency component of the surface shape of the sample, whereas the actuator having a small mass moves it in correspondence with the high-frequency component of the surface shape of the sample.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a view showing an AFM according to another embodiment;

DESCRIPTION OF THE PREFERRED EMBODIMENTS

First, the outline of the present invention will be described below.

Figure 10:
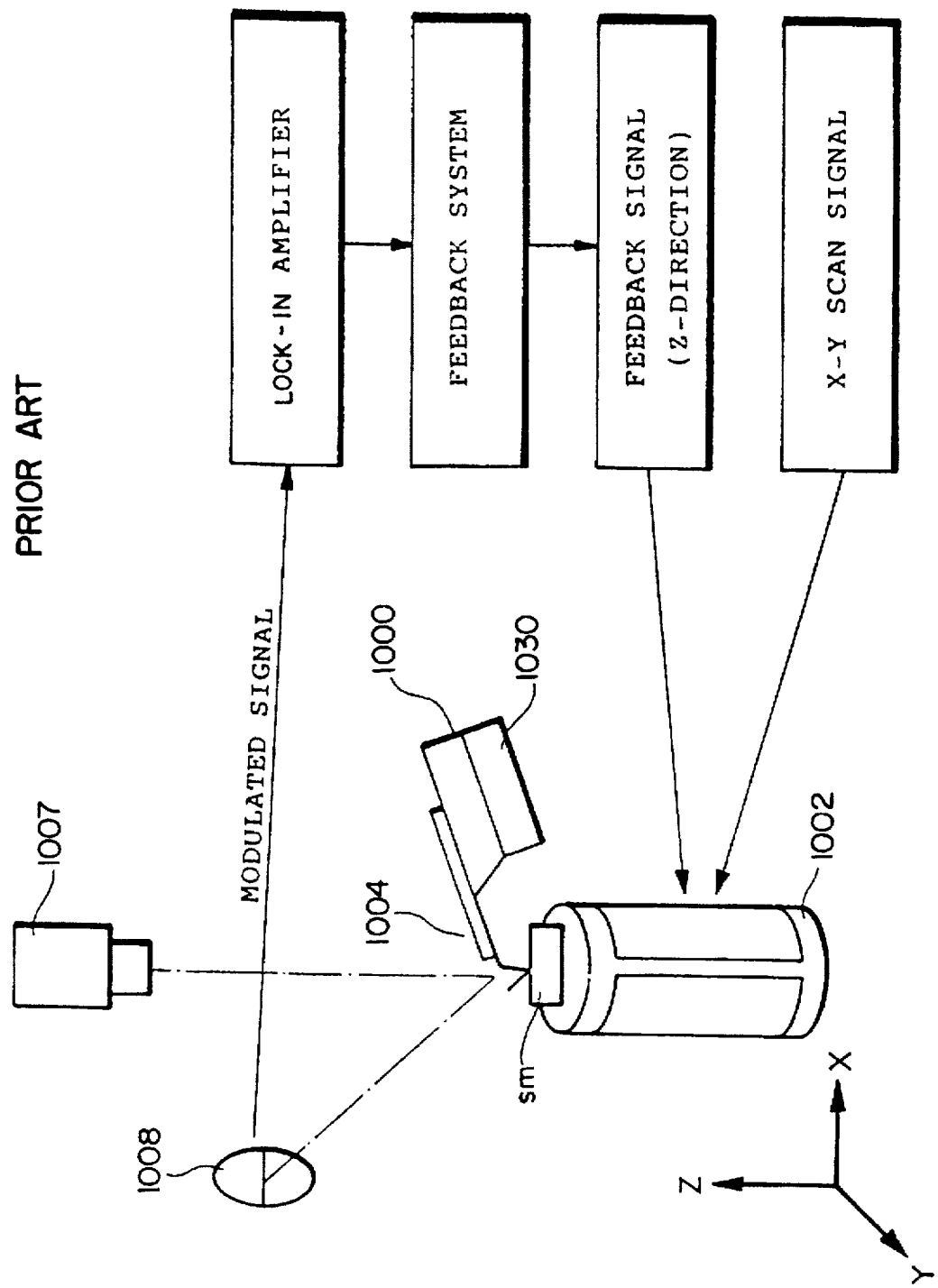
FIG. 10 is a view showing the schematic arrangement of an AFM for comparison.

An atomic force microscope (AFM) can allow observation of a nonconductive surface with an atomic resolution depending on conditions, and so receives a great deal of attention. FIG. 10 shows the schematic arrangement of an atomic force microscope (AFM) for comparison.

A cantilever 1004 consists of Si, and has a silicon nitride ($Si_3N_4$) probe formed at its tip. The cantilever is formed on the same member as that for a base 1000 by an etching technique. A piezoelectric element 1030 for exciting a cantilever is adhered to the base 1000.

On the other hand, a sample SM to be observed is held on a fine adjustment stage 1002 on a coarse adjustment stage (not shown) capable of independently driving X-, Y-, and Z-axes. The fine adjustment stage 1002 can be driven by an actuator consisting of four piezoelectric members independently in the X-, Y-, and Z-axis directions.

A mutual displacement in the Z-axis direction is controlled by the following method.

A laser beam is irradiated from an upper laser beam source 1007 on the tip portion of the cantilever 1004, and the laser beam reflected by the tip portion is detected by a two-division photodiode 1008.

Signals from the upper and lower photodiodes of the two-division photodiode 1008 are equivalent to the deflection amount of the tip portion of the cantilever, and input to a lock-in amplifier and applied as a feedback voltage through a feedback system to the actuator for driving the fine adjustment stage 1002 in the Z-axis direction.

By using this feedback voltage as a feedback signal, it can be controlled to always keep the distance between the sample surface and the probe of the cantilever constant.

The above control is executed while scanning the sample on the fine adjustment stage in the X- or Y-axis direction. Note that a microscope of this type is a so-called optical lever type atomic force microscope.

As described above, the feedback control for the axial driving actuator used to position the fine adjustment stage is performed using a tube-like actuator consisting of lead zirconate titanate (PZT) and having a length of about several tens mm.

When the tube actuator is attached to the base and stage, the vibration frequency of the tube actuator in Z-axis direction of the normal mode decreases to about 10 kHz, and the tube actuator cannot vibrate at a high frequency. On the other hand, even though the cantilever is fixed to the fixing member, the frequency of the cantilever remains higher than 30 kHz.

This atomic force microscope (AFM), however, cannot perform high-speed feedback control, observation of the surface shape of a sample takes a long period of time, and the operability is low.

The present inventors have made extensive studies to improve the above drawbacks of the atomic force microscope and found that the mass of the cantilever including the axial driving actuator is too large to perform high-speed feedback control.

It is an object of the present invention to enable high-speed feedback control by decreasing the mass of a cantilever including an axial driving actuator and eliminate drawbacks caused by the decrease in mass.

To achieve the above object, according to the present invention, there is provided a so-called atomic force microscope for observing the surface shape of a sample using a signal corresponding to an interatomic force or a distance between a probe and the sample surface by bringing the probe of a cantilever to the vicinity of the sample surface held by a sample stage and two-dimensionally scanning the sample surface with the probe, characterized in that a piezoelectric film sandwiched between a pair of electrodes is formed on the cantilever, and the piezoelectric film displaces the cantilever in a predetermined direction due to a $d_{31}$ inverse piezoelectric effect upon application of a signal voltage to the electrodes.

According to the present invention, there is provided an atomic force microscope comprising a moving mechanism for the sample stage, a vibrating mechanism for exciting the cantilever, a detecting system for detecting a signal corresponding to the interatomic force or the distance, a signal processing system for separating the signal into a high-frequency signal component corresponding to a fine structure of the sample surface and a low-frequency signal component corresponding to a corrugation and inclination of the sample surface and the like, and a control system for applying the high-frequency signal component as a high-speed feedback signal to the electrodes and applying the low-frequency signal component as a low-speed feedback signal to the moving mechanism.

In addition, according to the present invention, there is provided an atomic force microscope characterized in that the detecting system comprises an irradiation optical system for irradiating a laser beam toward the cantilever and a photosensor for receiving the light beam reflected by the cantilever, and detects a signal from the photosensor as a signal corresponding to the interatomic force or the distance.

Further, according to the present invention, there is provided an atomic force microscope characterized in that the detecting system detects a signal from the electrodes, formed on the cantilever, for the piezoelectric film as a signal corresponding to the interatomic force or the distance.

According to the present invention, there is provided an atomic force microscope characterized in that one of the electrodes, formed on the cantilever, for the piezoelectric film is constituted by a plurality of divided electrodes, and the detecting system detects signals from some of the divided electrodes as signals corresponding to the interatomic force or the distance.

Still further, according to the present invention, there is provided an atomic force microscope characterized in that the control system displaces the cantilever in the predetermined direction by applying the high-frequency signal component separated from the signal as a high-speed feedback signal to another divided electrode of the electrode for the piezoelectric film.

According to the present invention, there is provided an atomic force microscope characterized in that the piezoelectric film displaces the cantilever in the predetermined direction due to a $d_{31}$ inverse piezoelectric effect upon application of the high-speed feedback signal to the electrode, and the moving mechanism displaces the sample stage in the predetermined direction upon application of the low-speed feedback signal.

Moreover, according to the present invention, there is provided an atomic force microscope characterized in that the moving mechanism comprises a pair of electrodes sandwiching a larger piezoelectric film than the piezoelectric film formed on the cantilever, and a pair of electrodes sandwiching the piezoelectric film, and displaces the sample stage in the predetermined direction due to the $d_{31}$ inverse piezoelectric effect upon application of the low-speed feedback signal to the electrodes.

In an atomic force microscope, the displacement between a sample surface and a cantilever is controlled by feedback-controlling an actuator as large as several tens mm and a cantilever attached thereto. In consideration of this, the present invention uses a relatively small piezoelectric thin film (sandwiched between a pair of electrodes) formed on a cantilever so as to perform very fine driving (very fine displacement control) in a predetermined direction (e.g., the Z-axis direction) in which high-speed feedback control is required.

For this reason, according to the present invention, the mass of the cantilever including the piezoelectric thin film for very fine driving in a predetermined direction (e.g., the Z-axis direction) can be decreased, so that high-speed feedback control by the very fine driving (very fine displacement control by a high-frequency signal) becomes possible.

Further, since the inertia mass of the cantilever with the piezoelectric thin film is on the order of $10^{-5}$ of that of the tube actuator, the influence of the cantilever on other members such as base or frame is small while the cantilever is driven.

Note that a large actuator (an example of a sample stage moving mechanism) may be used, as in the prior art, to control a relatively large displacement With which the very fine driving in the predetermined direction (e.g., the Z-axis direction) cannot cope.

Next, the embodiments of the present invention will be described below. The same reference numerals denote the same parts throughout the description, and a repetitive description thereof will be omitted.

Figure 1:
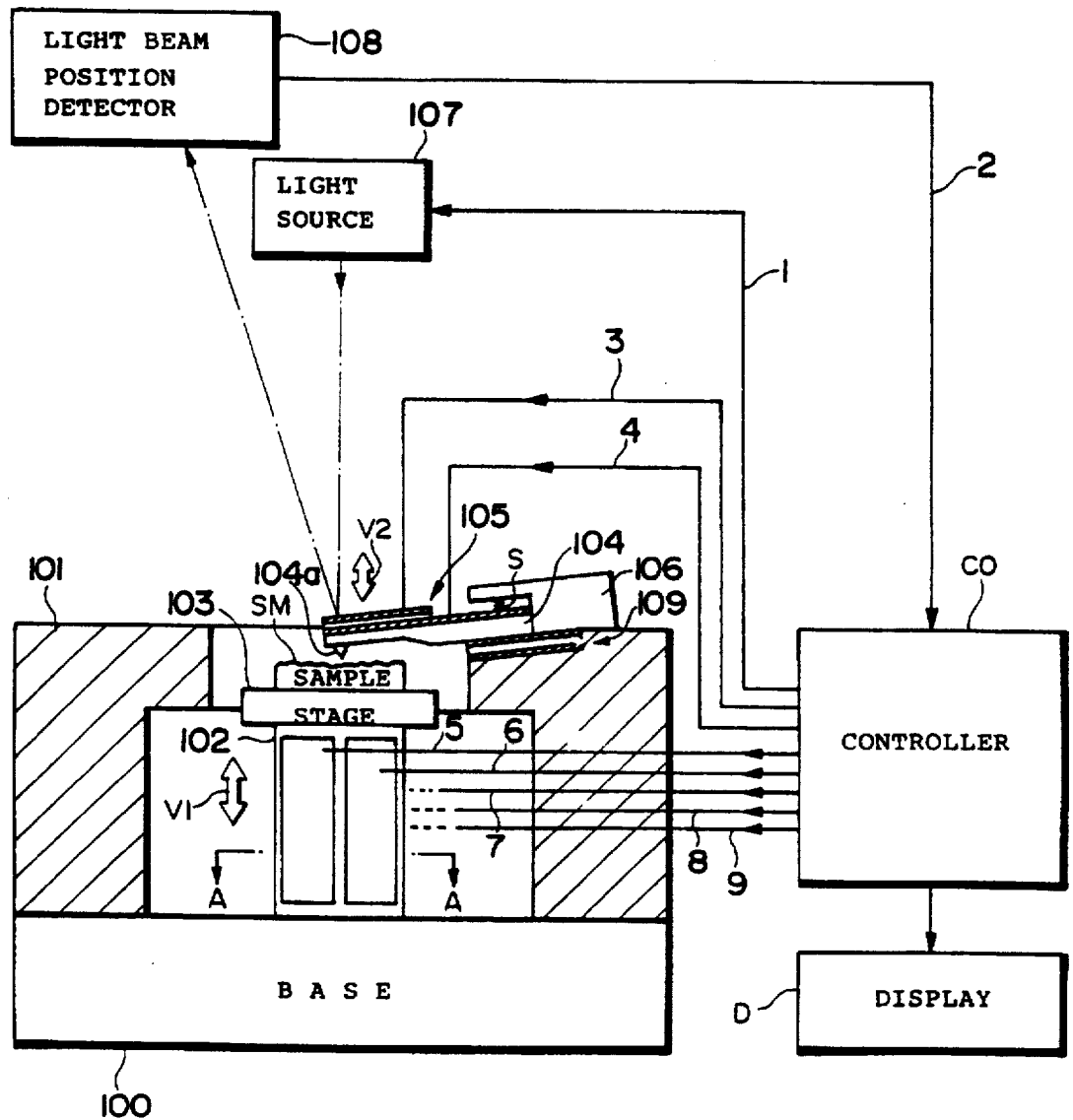
FIG. 1 is a view showing an AFM according to an embodiment.

FIG. 1 shows an atomic force microscope according to an embodiment. The atomic force microscope is of a scanning probe microscope type. A frame 101 having an opening at its central portion is fixed to a base 100. A tube-like piezoelectric actuator 102 is also fixed to the base 100. The actuator 102 is extendible in the vertical direction indicated by an arrow V1 by applying a voltage to its side electrode.

The tube actuator 102 extends toward the opening of the frame 101. A stage 103 is fixed to the upper end of the tube actuator 102. A sample SM is placed on the stage 103. A cantilever 104 is arranged above the stage 103. The cantilever has a probe 104a at its tip. The probe 104a is positioned near the surface of the sample SM. A piezoelectric actuator 105 is fixed to the cantilever 104. The piezoelectric actuator 105 is smaller in mass than the tube-like piezoelectric actuator 102. The piezoelectric actuator 105 is deflectable in the vertical direction indicated by an arrow V2, i.e., in the direction of thickness of the cantilever 104 by applying a voltage to the piezoelectric actuator 105 from a controller CO through wiring lines 3 and 4. A fixing member 106 and a vibrator 109 are respectively fixed to the upper surface of the frame 101. The vibrator 109 can vibrate vertically. A spring S is arranged between the upper surface of the cantilever 104 and the fixing member 106, and the lower surface of the cantilever 104 is fixed to the upper surface of the vibrator 109.

A light source 107 for emitting a laser beam is arranged above the cantilever 104. A laser beam emitted from the light source 107 is reflected by the cantilever 104, and the incident position of the reflected beam is detected by a light beam position detector 108. The light beam position detector 108 is a two-division photodiode or a charge-coupled device (CCD). The traveling direction of the reflected light beam changes depending on the deflection or strain amount of the cantilever 104. Accordingly, the light beam position detector 108 detects the deflection or strain amount of the cantilever 104.

The light source 107 is driven by a control signal supplied from the controller CO thereto through a wiring line 1. A light beam position signal output from the light beam position detector 108, i.e., a signal of information on the deflection amount of the cantilever 104 is input to the controller CO via a wiring line 2. The controller CO displays the surface shape (height) of a detected sample on a display D.

Figure 2:
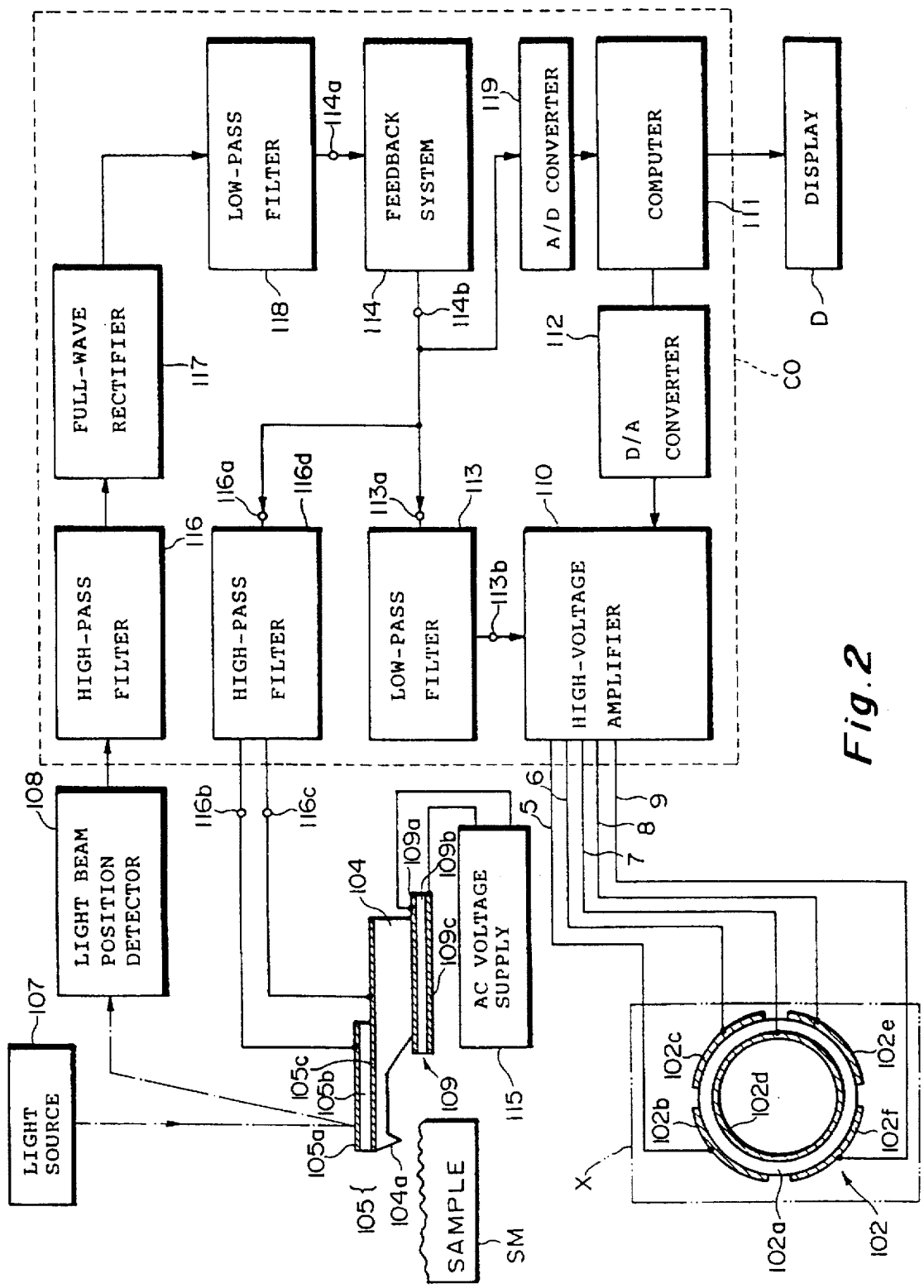
FIG. 2 is a view showing the system of the AFM in FIG. 1.

FIG. 2 is a block diagram showing the system of the microscope shown in FIG. 1. A region surrounded by a dotted line X in FIG. 2 illustrates a section of the tube-like piezoelectric actuator 102 taken along a line A—A in FIG. 1. The tube-like piezoelectric actuator 102 comprises an electrode 102d fixed to the inner surface of a tube-like piezoelectric crystal member 102a, and electrodes 102b, 102c, 102e, and 102f fixed to the outer surface. These electrodes 102b to 102f are connected to a high-voltage amplifier 110 through wiring lines 5 to 9, respectively. The high-voltage amplifier 110 amplifies an input signal and outputs the amplified signal. When a scanning signal is supplied from a computer 111 through a D/A converter 112, the high-voltage amplifier 110 applies a voltage to the electrodes 102b to 102f so as to horizontally move the tube-like piezoelectric actuator 102.

A low-pass filter 113 outputs a low-frequency component of a signal output from a feedback system 114 to the high-voltage amplifier 110. The high-voltage amplifier 110 adds a voltage output from the low-pass filter 113 to vertically move the tube actuator 102 to the voltage for horizontally scanning of the tube actuator 102, and outputs the resultant voltage.

An AC voltage supply 115 applies an AC voltage across electrodes 109a and 109c of the vibrator 109. Since a piezoelectric crystal layer 109b is interposed between the electrodes 109a and 109c, the vibrator 109 vibrates vertically upon application of the AC voltage across these electrodes 109a and 109c.

When the vibrator 109 vibrates, the cantilever 104 fixed thereon also vibrates. When the cantilever 104 vibrates, its probe 104a vibrates vertically. An interatomic force acts between the surface of the sample SM and the probe 104a in accordance with the distance therebetween. If the vibrator 109 vertically vibrates the probe, the amplitude of the vibration of the probe 104a, i.e., the deflection amount of the cantilever 104 changes in accordance with the interatomic force between the probe 104a and the surface of the sample SM. Therefore, the distance between the surface of the sample SM and the probe 104a can be measured by detecting this deflection amount by the light beam position detector 108.

When the vibrator 109 vertically vibrates the probe while the tube-like piezoelectric actuator 102 horizontally scans the sample SM, the light beam position detector 108 outputs a signal including information on the distance between the surface of the sample SM and the probe 104a. These pieces of distance information are two-dimensionally combined into information, thereby measuring the surface shape of the sample SM.

In this apparatus, the tube-like piezoelectric actuator 102 and thin-film piezoelectric actuator 105 are controlled to keep the information on the distance between the surface of the sample SM and the probe 104a (information on the deflection amount of the cantilever) constant. This will be described in detail below.

The vibrator 109 vibrates at a frequency of 40 kHz, so that the probe 104a vibrates at 40 kHz. The vibration of the probe 104a changes on the basis of the surface shape of the sample SM. That is, the vibration of the probe 104a is modulated in accordance with the surface shape of the sample SM, i.e., the distance between the probe 104a and the surface of the sample SM. When a modulated signal output from the light beam position detector 108 passes through a high-pass filter 116, only a signal of 40 kHz passes therethrough. The modulated signal passing through the high-pass filter 116 includes information on the surface shape of the sample SM. The modulated signal passing through the high-pass filter 116 is input to a full-wave rectifier 117. The signal passing through the full-wave rectifier 117 is input to a low-pass filter 118, and a signal proportional to the DC component of the input signal is output from the low-pass filter 118. Therefore, when the distance between the probe 104a and the surface of the sample SM changes, the modulated signal changes to change the level of a signal output from the low-pass filter 118.

The feedback system 114 outputs a signal so as to keep a signal input thereto constant. More specifically, when the level of a signal output from the low-pass filter 118 increases, the feedback system 114 outputs a signal so as to decrease the level; when the level of a signal output from the low-pass filter 118 decreases, the feedback system 114 outputs a signal so as to increase the level. In other words, the feedback system 114 outputs a servo signal so as to keep the distance between the neutral position of the probe 104a and the surface of the sample SM constant. That is, this signal corresponds to the surface shape of the sample SM. Since this signal is input to the computer 111 through an A/D converter 119, the computer 111 can display information on the surface shape of the sample SM on the display D.

While scanning the tube-like piezoelectric actuator 102, the tube-like piezoelectric actuator 102 and the thin-film piezoelectric actuator 105 are driven to keep the distance between the probe 104a and the surface of the sample SM constant. For example, if this distance decreases, and the level of the servo signal output from the feedback system 114 exceeds a reference value, the tube-like piezoelectric actuator 102 or the thin-film tube-like piezoelectric actuator 105 operates to increase the distance, and the level of the servo signal returns to the reference value. If this distance increases, and the level of the servo signal output from the feedback system 114 becomes less than the reference value, the tube-like piezoelectric actuator 102 or the thin-film actuator 105 operates to decrease the distance, and the level of the servo signal returns to the reference value.

The low-frequency component of the servo signal is input to the tube actuator 102 through the low-pass filter 113, whereas the high-frequency component of the servo signal is input to the thin-film piezoelectric actuator 105 through a high-pass filter 116d.

The thin-film piezoelectric actuator 105, of FIG. 2, comprises a thin-film piezoelectric crystal member 105b interposed between electrodes 105a and 105c.

Figure 3A:
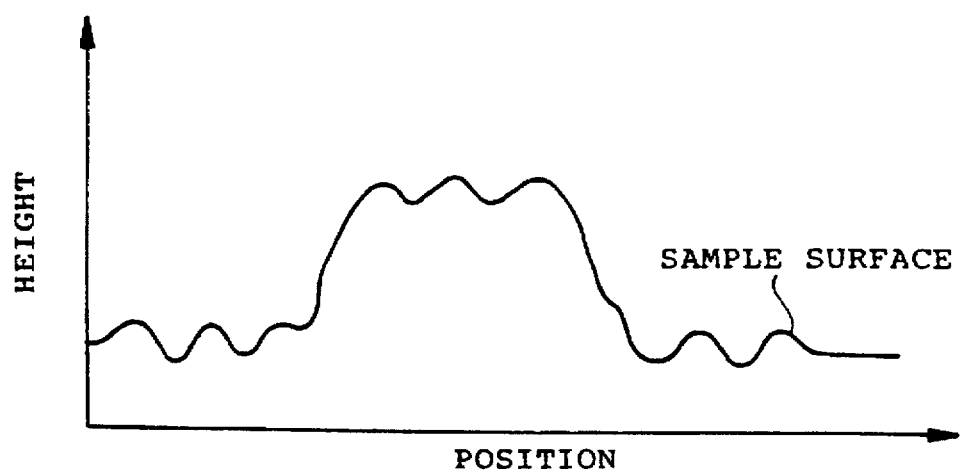
FIGS. 3A to 3C are graphs showing the surface shapes of a sample.
Figure 3B:
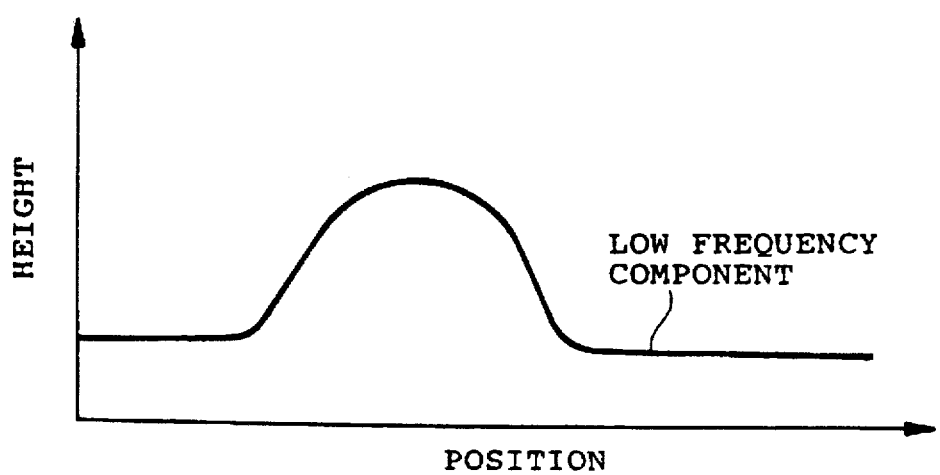
Figure 3C:
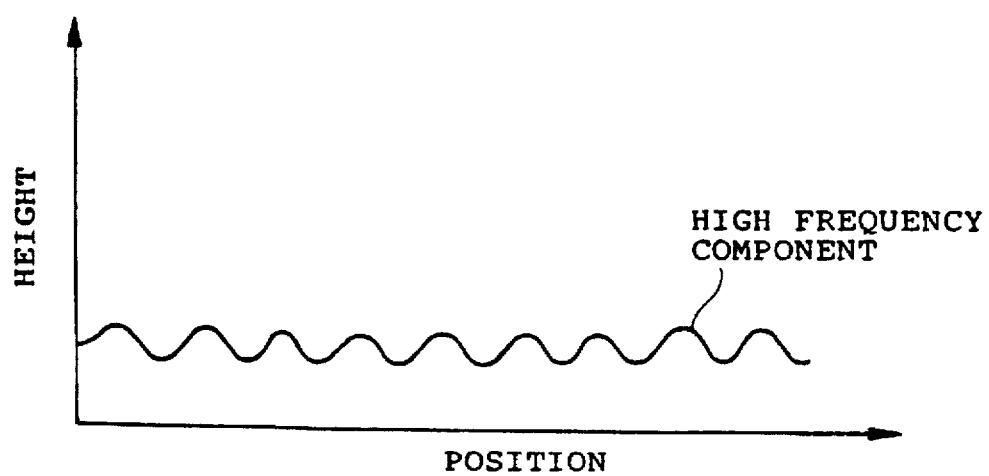

FIG. 3A shows the surface shape of the sample SM. This surface shape is obtained by synthesizing a low-frequency component shown in FIG. 3B and a high-frequency component shown in FIG. 3C. Since the servo signal has the same shape as the surface shape of the sample SM, the tube-like piezoelectric actuator 102 moves to trace the low-frequency component of the surface shape of the sample SM, and the thin-film actuator 105 moves to trace the high-frequency component of the surface shape of the sample SM. High-frequency vibrations tend to vibrate the frame 101. However, since the thin-film piezoelectric actuator 105 is sufficiently smaller in mass than the tube-like piezoelectric actuator 102, even if the thin-film piezoelectric actuator 105 is vibrated at a high frequency, the frame 101 does not vibrate.

As described above, this apparatus comprises:

(a) the tube-like piezoelectric actuator 102 extendible in the first direction V1;

(b) the cantilever 104 arranged on the extension line of the extending direction of the tube-like piezoelectric actuator 102 and deflectable in the first direction V1;

(c) the thin-film piezoelectric actuator 105 arranged on the cantilever 104, the thin-film piezoelectric actuator 105 being lighter than the tube-like piezoelectric actuator 102;

(d) the piezoelectric vibrator 109 mechanically coupled to the cantilever;

(e) the light beam position detector 108 for detecting the deflection amount of the cantilever;

(f) the feedback system having a first input terminal 114a electrically connected to the light beam position detector 108, and a first output terminal 114b for outputting an output signal so as to keep a signal input to the first input terminal 114a constant;

(g) the low-pass filter 113 having the second input terminal 113a for receiving the output signal from the feedback system 114, and the second output terminal 113b for outputting the low-frequency component of the signal inputted to the second input terminal 113a, the second output terminal 113b being electrically connected to the tube-like piezoelectric actuator 102; and (h) the high-pass filter 116d having the third input terminal 116a for receiving the output signal outputted from the feedback system 114, and the third output terminal 116c for outputting the high-frequency component of the signal inputted to the third input terminal 116a, the third output terminal 116c being electrically connected to the thin-film piezoelectric actuator 105. Note that the terminal 116b is fixed to a ground potential.

In place of the light beam position detector shown in FIG. 2, a piezoelectric strain detector 408 shown in FIG. 4 may be used. This piezoelectric strain detector 408 is fixed to the cantilever 104 to output a piezoelectric signal in accordance with the deflection amount of the cantilever. This piezoelectric strain detector 408 comprises a piezoelectric crystal layer 408b and electrodes 408a and 408c formed on the piezoelectric crystal layer 408b. Also in this apparatus, the surface shape of the sample SM can be measured.

Figure 5:
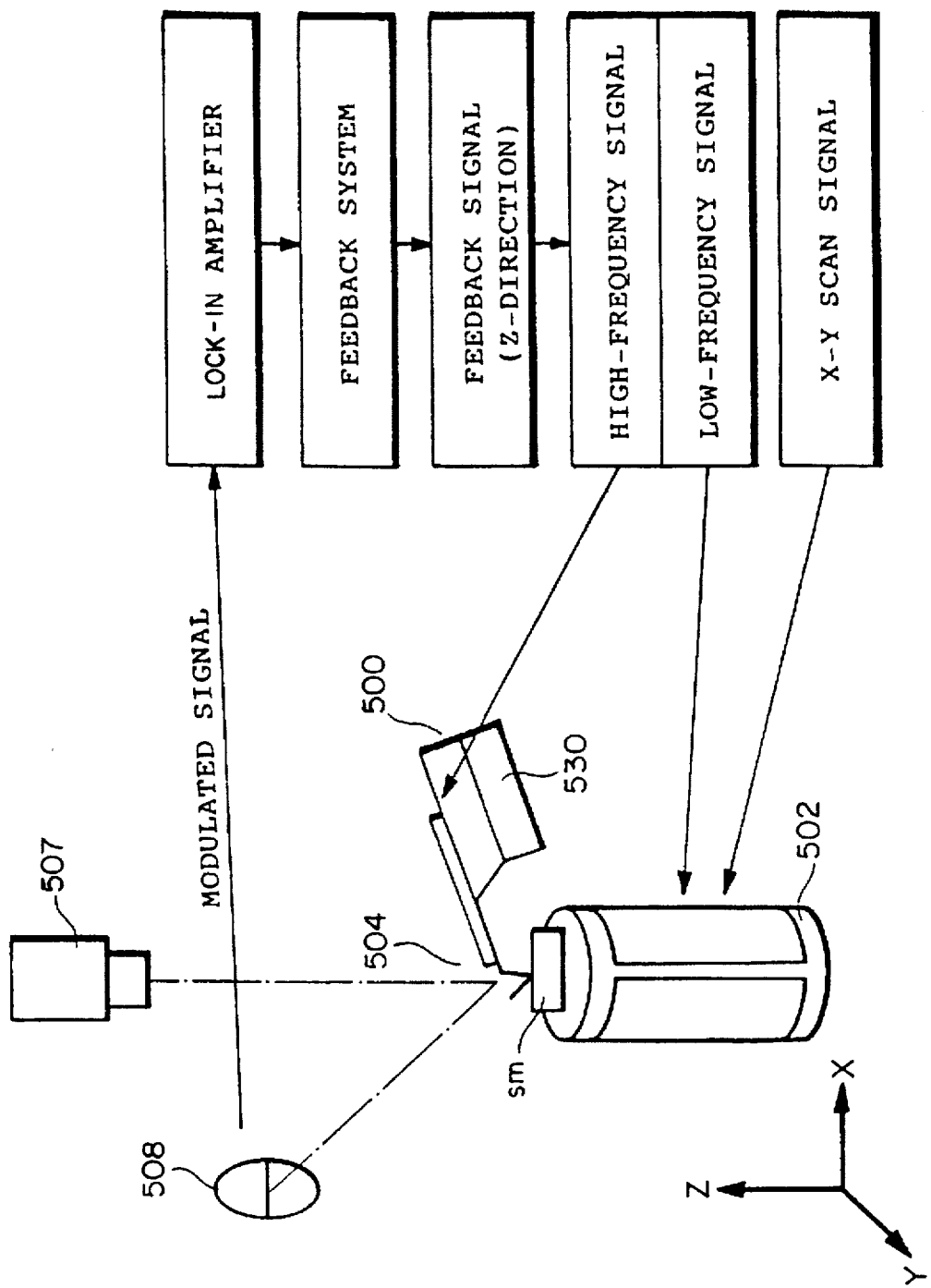
FIG. 5 is a view showing the schematic arrangement of an AFM according to still another embodiment.

FIG. 5 is a view showing the schematic arrangement of an AFM according to another embodiment.

The measurement principle of the AFM is to measure the surface shape of a sample by driving a cantilever in the Z-axis direction during scanning in the X- and Y-axis directions so as to keep an interatomic force acting between the sample surface and the probe of the cantilever constant, and measuring the Z-axis displacement at that time.

First, a cantilever used in this embodiment will be described with reference to FIG. 6.

A cantilever 504 extrudes (projects) from a base portion 500, both of which are made from monocrystalline silicon wafers by using an etching technique.

A silicon nitride ($Si_3N_4$) film 535 is formed by the CVD method on the upper surfaces of a silicon substrate 533 for the cantilever and a silicon substrate 534 which are made from monocrystalline silicon wafers. A platinum (Pt) film 536 is formed as a lower electrode by a sputtering method on the resultant structure, and a piezoelectric thin-film (PZT film) 537 is formed by a sputtering method on the entire upper surface of the cantilever and a portion extending to the cantilever connecting portion of the silicon substrate 534.

Finally, one upper electrode 538 is formed at substantially the central portion of the piezoelectric thin-film 537 so as to be parallel to the cantilever in the longitudinal direction. Note that a silicon nitride ($Si_3N_4$) probe 504a is formed facing downward at the tip portion of the silicon substrate 533 for the cantilever in advance.

The whole cantilever 504 thus formed has a length of 0.85 mm, a width of 0.2 mm, and a thickness of 20 μm.

In FIG. 5, an excitation vibrator 530 is adhered to the lower portion of the base 500 of the cantilever 504. The excitation vibrator 530 is one small PZT plate 530 having electrodes on its two surfaces and polarized in the direction of thickness. The cantilever 504 is vibrated by applying a voltage at a frequency of about 40 kHz to the electrodes of the excitation vibrator 10.

A sample SM to be observed is placed on a fine adjustment stage on a PZT hollow actuator (Z-axis driving actuator) 502 capable of driving in the respective X-, Y-, and Z-axis directions and having a length of about 50 mm. The PZT hollow actuator 502 is placed on a coarse adjustment stage (not shown), and this stage can independently drive the X-, Y-, and Z-axes.

Scanning by the cantilever 504 in the X- and Y-axis directions can be performed by driving the fine adjustment stage. The PZT hollow actuator 502 is normally called a tube scanner, which is capable of three-dimensional scanning and positioning in the X-, Y-, and Z-axis directions. The PZT hollow actuator 502 is generally arranged on the coarse adjustment stage and performs coarse positioning with this stage.

An He—Ne laser beam is irradiated from an upper laser beam source 507 on the upper surface at the tip portion of the cantilever 504, and the laser beam reflected by the tip portion is incident on a two-division photodiode 508.

The displacement of the cantilever 504 in the Z-axis direction is detected by the two-division photodiode 508. On the other hand, a signal representing the Z-axis displacement supplied from the two-division photodiode 508 is input to a lock-in amplifier and extracted as a feedback signal in the Z-axis direction through a feedback system.

A signal indicating the surface shape of the sample SM in the feedback signal is separated into a high-frequency signal reflecting a fine structure and a low-frequency signal reflecting the corrugation and inclination of the surface and the like.

The high-frequency signal sensitively responds to a fine surface structure, is supplied to as a feedback voltage to the electrodes 536 and 538 sandwiching the piezoelectric thin-film 537 on the cantilever 504 therebetween, and is fed back to keep an interatomic force faithfully constant, i.e., to allow the tip probe (probe) 504a of the cantilever 504 to assure a constant distance so as to conform to the fine structure.

On the other hand, a large inclination of the surface and the like cannot be corrected by the displacement by the piezoelectric thin-film 537. For this reason, a low-frequency signal is supplied as a low-frequency signal to an electrode formed on the side surface of the Z-axis driving the PZT hollow actuator 502, thereby controlling the distance between the probe 504a and the sample surface to be constant even with an inclination.

Since the mass of the cantilever 504 capable of driving in the Z-axis direction and having the PZT thin-film 537 formed thereon is much smaller than that of the driving system including the PZT hollow actuator 502 for Z-axis driving, the cantilever 504 has a high sensitivity with respect to a fine surface structure.

A distance, however, which can be corrected by applying a voltage to the electrodes 536 and 538 of the PZT thin-film 537 is about 1 μm with the 0.85-mm long cantilever. For this reason, if a distance to be corrected exceeds this width due to an inclination, a large corrugation, or the like on the surface, these signals are fed back at low frequencies. Accordingly, the low-frequency signal is fed back to the Z-axis driving the PZT hollow actuator 502 to correct the interval between the probe 504a and the sample SM.

With the above atomic force microscope, a fine structure of the measurement surface of a sample can be measured over a long distance with a high sensitivity.

Note that an output from the two-division photodiode 508 can be used in a contact mode because its DC component is detectable. In the contact mode, the resonance frequency of the cantilever is improved due to the contact with the surface, compared to that in a free movement mode, and the Q value is also reduced, thereby widening the feedback band. Therefore, a larger effect of the present invention can be obtained.

Figure 7:
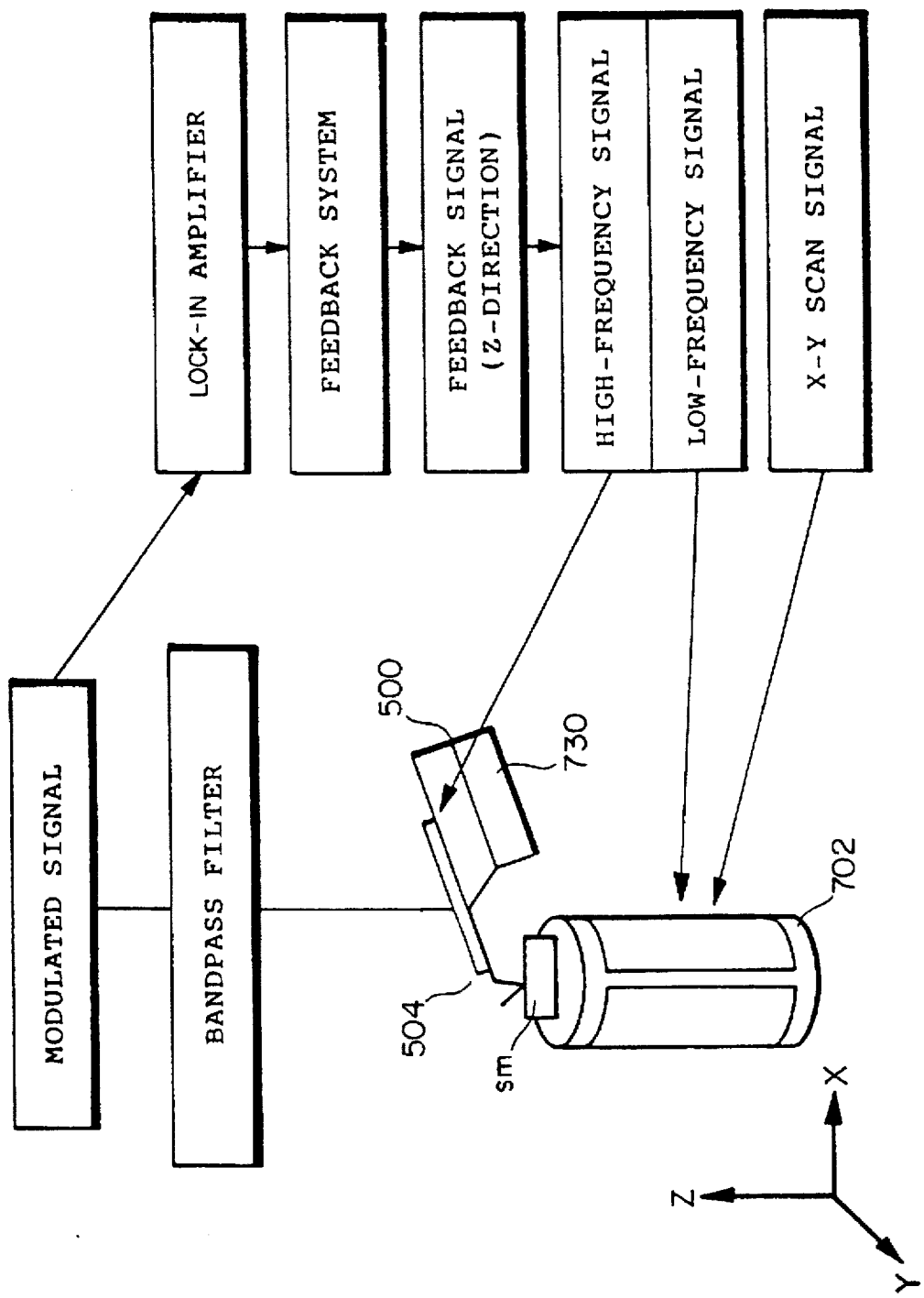
FIG. 7 is a view showing the schematic arrangement of an AFM according to still another embodiment.

FIG. 7 shows an AFM (schematic arrangement) according to still another embodiment.

Figure 6:
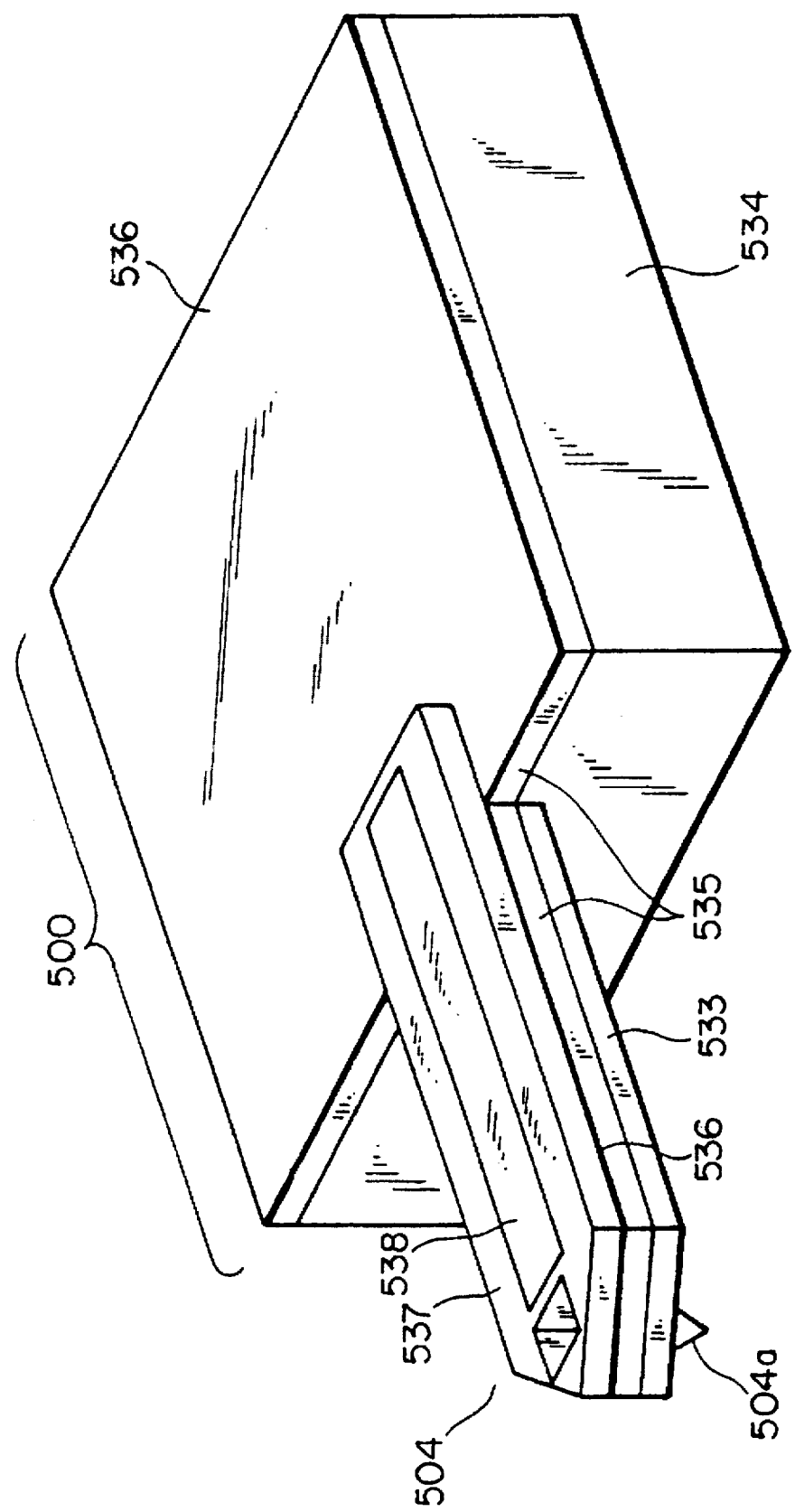
FIG. 6 is a perspective view showing the structure of a cantilever used in still another embodiment.

In FIG. 6, the displacement (in the Z-axis direction) of the cantilever 504 is detected by irradiating a laser beam on the tip portion of the cantilever and receiving the reflected beam by the two-division photodiode 508. This embodiment, however, requires neither the laser nor the light-receiving element (two-division photodiode).

This embodiment uses a cantilever 504 having the same structure as that in the above-described embodiment. A sample SM to be observed is set on a fine adjustment stage on a hollow actuator 702 for Z-axis driving, and the hollow actuator 702 is set on a coarse adjustment stage (not shown) capable of X-Y plane scanning.

When a probe 504a of the cantilever 504 is brought to the vicinity of the sample SM while being excited by an excitation vibrator 730, an interatomic force acts between the sample surface and the probe 504a. If the cantilever 504 is scanned in the X-Y plane in this state, the surface shape of the sample can be measured by driving the cantilever in the Z-direction to keep the interatomic force, which acts between the probe 504a and the sample surface, constant, and measuring the displacement in the Z-axis direction at that time.

Note that an upper electrode 538 of a piezoelectric thin-film 537 formed on the cantilever 504 outputs a signal based on the Z-axis displacement and the feedback signal of a high-frequency signal input for excitation. Since the signal based on the displacement is at about 40 kHz, and the high-frequency signal is at a maximum of 20 kHz, these two signals can be separated from each other via a bandpass filter.

The high-frequency signal obtained upon separation becomes a feedback signal through a lock-in amplifier and a feedback system, and the feedback signal is discriminated into a high-frequency signal based on a fine structure of the sample surface and a low-frequency signal based on a large corrugation and an inclination.

The high-frequency signal is supplied to an electrode 536 and 538 to operate the cantilever 504 at a high speed and cause it to trace the surface shape. To the contrary, the low-frequency signal is supplied to the side electrode of the Z-axis driving hollow actuator 702 to displace the cantilever 504 in the Z-axis direction, thereby correcting corrugations and inclinations.

As described above, this embodiment requires neither a laser nor a light-receiving element, and the structure is greatly simplified. In addition, in this embodiment, the piezoelectric thin-film 537 formed on the cantilever 504 can obtain a large output. For this reason, a rectifying circuit consisting of a simple diode can be used in place of an expensive lock-in amplifier.

In this embodiment, a feedback signal is obtained from the electrode 538 of the piezoelectric thin-film 537 formed on the cantilever 504.

The cantilever 504 is driven by the excitation frequency of the excitation vibrator 730, and a signal can be obtained from the electrode 538 of the piezoelectric thin-film 537 in accordance with the operation of the cantilever 504. If the probe of the cantilever 504 is brought to the vicinity of the surface of the sample SM, a modulated signal in accordance with the interatomic force or distance between the sample surface and the probe can be detected from the electrode 538 of the piezoelectric thin-film 537.

The signal from the electrode 538 of the piezoelectric thin-film 537 can be therefore used as a feedback signal, and high- and low-frequency signals are extracted from the output waveform of this feedback signal. The high-frequency signal is supplied as a feedback voltage to the electrodes 536 and 538 of the piezoelectric thin-film 537, while the low-frequency signal is supplied to the Z-axis driving actuator 21 (an example of a sample stage moving mechanism).

Needless to say, in observation (measurement) of a sample surface having small corrugations in a narrow sample observation range, only control of the displacement of the cantilever by a high-frequency feedback signal is required.

Figure 8:
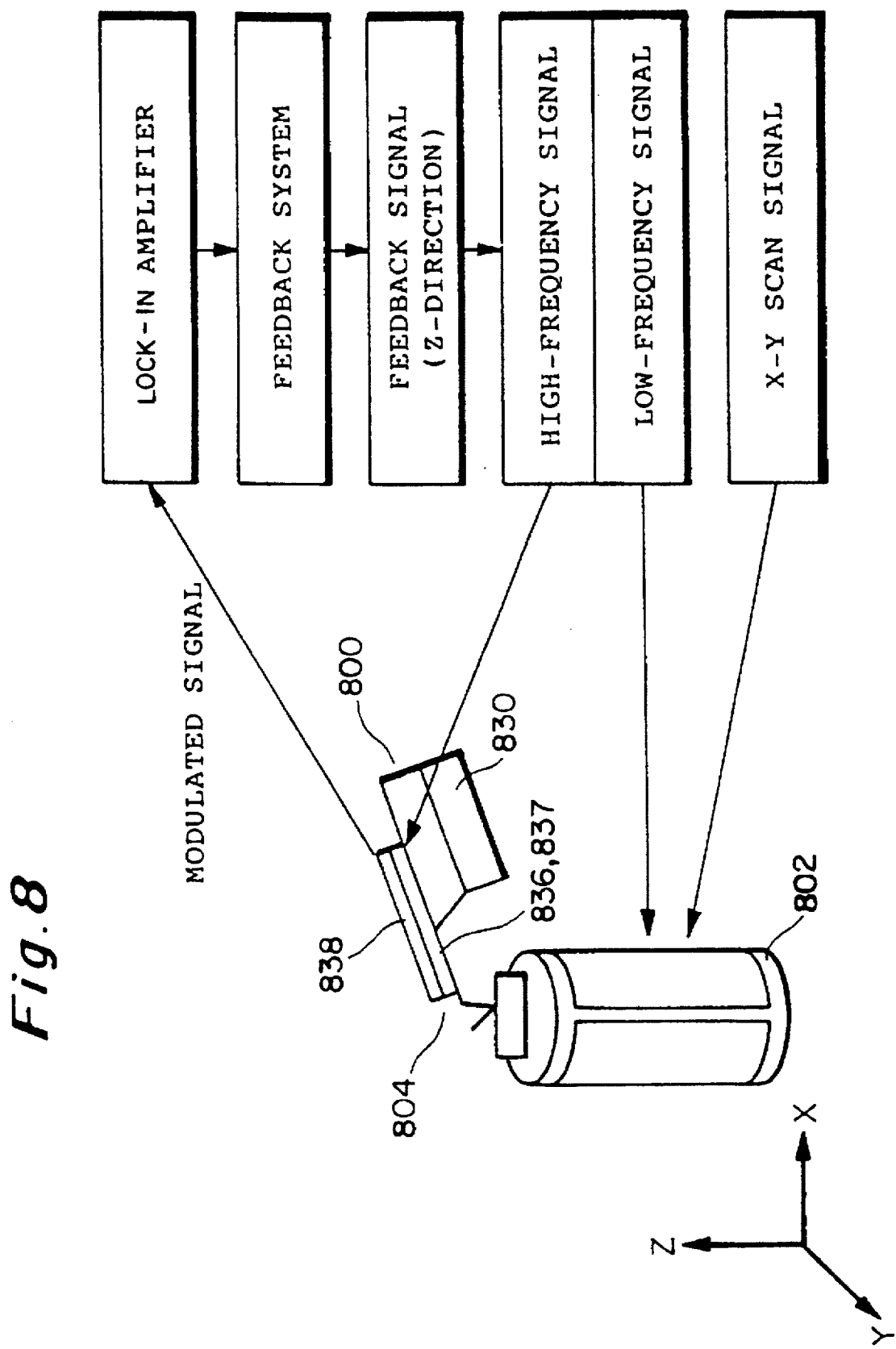
FIG. 8 is a view showing the schematic arrangement of an AFM according to still another embodiment.

FIG. 8 shows an AFM (schematic arrangement) according to still another embodiment. This embodiment also obtains the displacement in the Z-axis direction by a signal from an electrode on a cantilever 804 without using an optical sensor.

Figure 9:
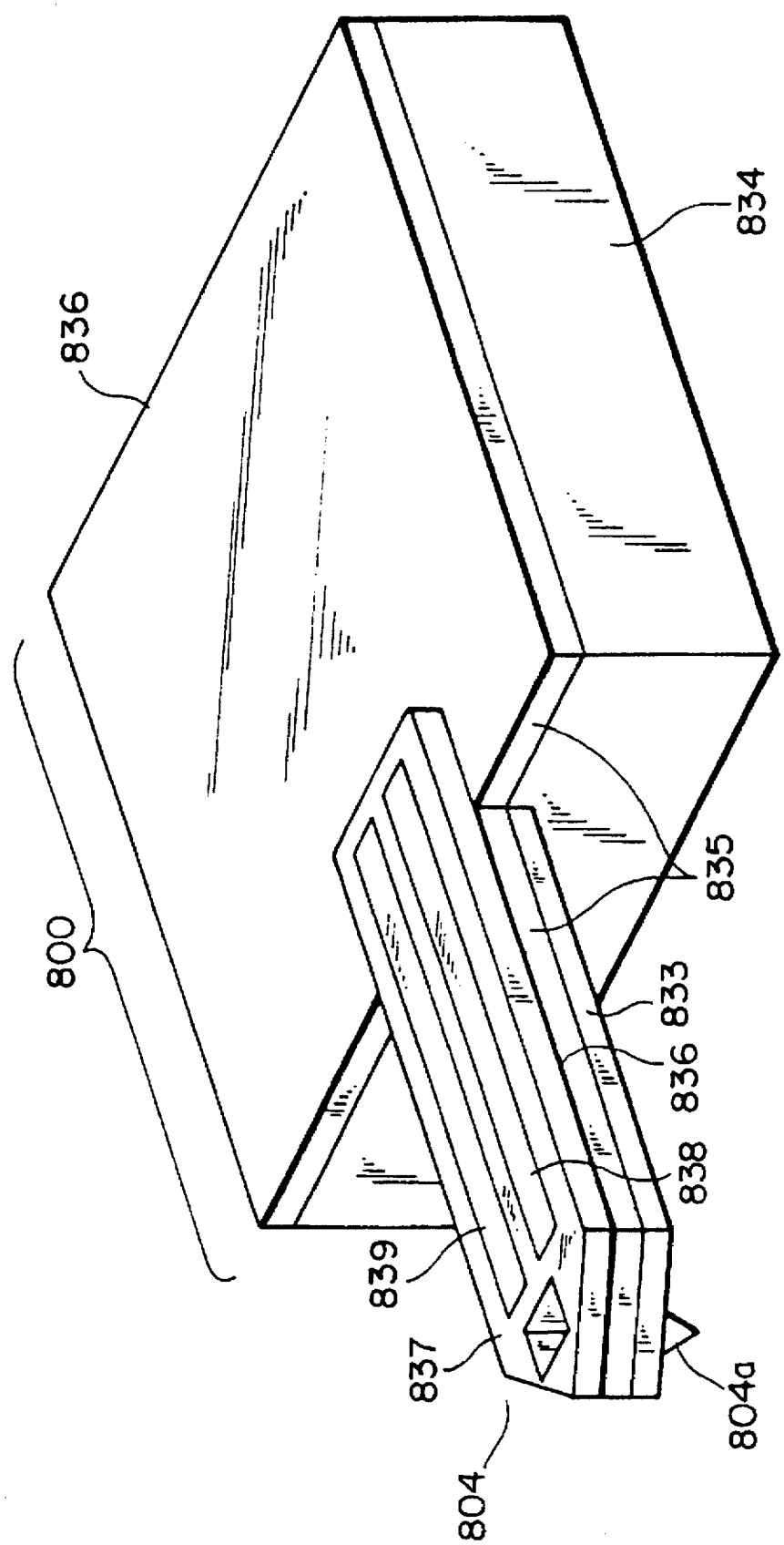
FIG. 9 is a perspective view showing the structure of a cantilever used in still another embodiment.

The cantilever 804 used in this embodiment will be described with reference to FIG. 9.

The cantilever 804 is constituted to extrude (project) from a base 800. Substrates 833 and 834 are made from monocrystalline silicon wafers by using an etching technique.

A silicon nitride ($Si_3N_4$) film 835 is formed by the CVD method on the substrates 833 and 834 formed by the etching technique, and a platinum (Pt) film is formed as a lower electrode film 836 on the film 835 by a sputtering method.

A piezoelectric thin-film (ZnO film) 837 is formed by a sputtering method on the entire surface of the cantilever 804 on the lower electrode film 836 and a portion, of the substrate 834, extending from a connecting portion with the cantilever. Two electrodes 838 and 839 are formed on the ZnO film 837 so as to be parallel to each other and to the cantilever 804 in the direction of length.

A silicon nitride ($Si_3N_4$) probe 804a is formed at the lower portion of the tip of the cantilever 804 in advance, similar to the above embodiment. The resultant cantilever 804 has a length of 0.85 mm, a width of 0.2 mm, and a thickness of 20 μm, as in the above embodiment.

Similar to the above embodiment, one small PZT plate 830 sandwiched between a pair of electrodes and polarized in the direction of thickness is adhered to the lower surface of the cantilever substrate 834. The PZT 830 is excited and vibrated by applying a voltage at a frequency of about 40 kHz to the electrodes of the PZT plate 830, thereby vibrating the cantilever 804.

A sample to be observed is placed on a fine adjustment stage of a PZT hollow actuator 802 capable of driving in the Z-axis direction and having a length of about 50 mm. The fine adjustment stage is placed on a coarse adjustment stage (not shown) to be driven in the X-, Y-, and Z-axis directions. X-Y scanning of the cantilever 804 is executed by driving this coarse adjustment stage.

The measurement principle of the AFM is the same as that in the above embodiment, and is to measure the surface shape of a sample by driving the cantilever 804 in the Z-axis direction during X-Y scanning so as to keep an interatomic force acting between the probe 804 and the sample surface constant, and measuring the displacement in the Z-axis direction at that time.

In this embodiment, the electrode 838 of the upper electrodes on the ZnO film formed on the cantilever 804 is used to extract a feedback signal, and the electrode 39 is used to apply the feedback voltage of a high-frequency signal. Upon application of this voltage, the cantilever 804 is displaced in the Z-axis direction at a high speed. The signal obtained from the electrode 838 becomes a feedback signal through a lock-in amplifier and a feedback system, and the feedback signal is discriminated into a high-frequency signal based on a fine structure of the sample surface and a low-frequency signal based on a large corrugation and an inclination.

The high-frequency signal is supplied to the electrode 838 to operate the cantilever 804 at a high speed and cause it to trace the surface shape. To the contrary, the low-frequency signal is supplied to the side electrode of the Z-axis driving actuator 41 to displace the cantilever 804 in the Z-axis direction and correct corrugations and inclinations.

This embodiment requires neither an optical system including a laser nor a light-receiving element, and the structure is greatly simplified.

In this embodiment, the divided electrodes 838 and 839 are formed on the piezoelectric thin-film 837.

At least one of the plurality of divided electrodes is used as an electrode for extracting a feedback signal, and another divided electrode is used as an electrode for applying the feedback voltage of a high-frequency signal extracted from the feedback signal. With this structure, feedback processing is performed at a high speed. In addition, a low-frequency signal extracted from the feedback signal is fed back to the Z-axis driving actuator (an example of a sample stage moving mechanism).

In this structure, the vibrator is attached to the substrate of the cantilever to excite the cantilever. However, the cantilever can be excited by using some of the divided electrodes of the piezoelectric thin-film.

The above embodiments are merely examples of the present invention, and the present invention is not limited to these embodiments.

As described above, a piezoelectric thin-film formed on a cantilever according to the present invention is constituted to be sandwiched between a pair of electrodes, and is vibrated by a cantilever vibration mechanism (e.g., an excitation vibrator).

When the probe of the cantilever receives an interatomic force from a sample surface, the amplitude and phase of the cantilever change. With these changes, information on the distance between the probe and the sample surface, which reflects the interatomic force, can be obtained from the electrodes for the piezoelectric thin-film on the cantilever. That is, the microscope can operate similar to a conventional AFM.

Although the strain signal of the cantilever changed by feedback control is also superposed on the signal from the electrodes for the piezoelectric thin film, this signal can be separated because its frequency is lower than the excitation frequency. This separation can be performed by only a lock-in amplifier. If a band-pass filter having about the excitation frequency is used, a stabler signal can be obtained.

Modulation caused by a fine change in surface shape of a sample is fed back as a high-frequency component to the electrode of the piezoelectric thin film. Therefore, the surface shape can be measured at a high speed by applying a voltage equivalent to the high-frequency signal to the piezoelectric thin-film and vertically operating the cantilever at a high speed so as to cancel the modulation component.

If the sample surface is greatly corrugated or inclined, the signal is modulated as a low-frequency component. This modulated portion is extracted and fed back to a sample stage moving mechanism (e.g., a Z-axis driving actuator), thereby correcting the corrugation or inclination and measuring the sample surface.

The piezoelectric thin-film may be used for only high-speed feedback of a high-frequency signal. At this time, a mechanism (e.g., an optical lever) for extracting a high-speed feedback signal must be used.

The electrode on the cantilever need not be formed into one but can be formed into a plurality of divided electrodes by using a lithography technique. At this time, if at least one divided electrode is used to extract a feedback signal, and another divided electrode is used to apply the feedback voltage of a high-speed feedback signal, as described above, the piezoelectric thin-film (and the electrodes) can be used for signal extraction and high-speed feedback driving.

As the piezoelectric thin-film, although a ZnO film and the like can be used, a high-quality PZT film is particularly preferable in consideration of the piezoelectric constant.

As has been described above, according to the present invention, a shape based on a fine structure of a sample surface can be measured by driving a piezoelectric thin-film on a cantilever on the basis of a feedback signal and operating the cantilever at a high speed. Therefore, the present invention greatly contributes to a reduction in measurement time of a scanning probe microscope, which is an important subject in the industrial field.

Further, according to the present invention, a measurement apparatus using an optical method or the like is eliminated by using a signal, as a feedback signal, from the electrode of the piezoelectric thin film of the cantilever. The structure of an atomic force microscope itself can be simplified.

As many apparently widely different embodiments of the present invention can be made without departing from the spirit and scope thereof, it is to be understood that the invention is not limited to the specific embodiments thereof except as defined in the appended claims.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A scanning probe microscope comprising:
   (a) a first piezoelectric actuator extendible in a first direction;
   (b) a cantilever arranged on an extension line of an extending direction of said first piezoelectric actuator and deflectable in the first direction;
   (c) a second piezoelectric actuator arranged on said cantilever, said second piezoelectric actuator being lighter than said first piezoelectric actuator;
   (d) a piezoelectric vibrator mechanically coupled to said cantilever;
   (e) a detector for detecting a deflection amount of said cantilever;
   (f) a feedback system having a first input terminal electrically connected to said detector, and a first output terminal for outputting an output signal so as to keep a signal input to said first input terminal constant, said output signal having a low-frequency component and a high-frequency component;
   (g) a low-pass filter having a second input terminal for receiving the output signal from said feedback system, and a second output terminal for outputting the low-frequency component of the output signal inputted to said second input terminal, said second output terminal being electrically connected to said first piezoelectric actuator; and
   (h) a high-pass filter having a third input terminal for receiving the output signal outputted from said feedback system, and a third output terminal for outputting the high-frequency component of the output signal inputted to said third input terminal, said third output terminal being electrically connected to said second piezoelectric actuator.

2. A scanning probe microscope according to claim 1, further comprising:
   a display; and
   a computer for displaying the signal output from said feedback system on said display,
   said display displaying a surface shape of a sample to be measured.

3. A scanning probe microscope according to claim 1, further comprising:
   a light source capable of emitting a light beam toward said cantilever;
   wherein said detector includes a light beam position detector for detecting a position of the light beam being reflected by said cantilever.

4. A scanning probe microscope according to claim 3, wherein said light beam position detector is a two-division photodiode.

5. A scanning probe microscope according to claim 1, wherein said detector is a piezoelectric strain detector arranged on said cantilever.

6. A scanning probe microscope according to claim 5, wherein said piezoelectric strain detector comprises a piezoelectric layer and an electrode formed on said piezoelectric layer.

7. A scanning probe microscope comprising:
   a fine adjustment stage for staging a sample;
   a cantilever;
   a piezoelectric actuator, arranged on the cantilever, for extending in a first direction;
   a piezoelectric vibrator, mechanically coupled to the cantilever, for vibrating the cantilever; and
   a controller for detecting a deflection of the cantilever, and for controlling the fine adjustment stage and the piezoelectric actuator.

8. A scanning probe microscope according to claim 7, wherein the fine adjustment stage further comprises a plurality of piezoelectric members for extending the fine adjustment stage in an X, Y, and Z axis direction.

9. A method for scanning a surface shape of a sample in a scanning probe microscope, the method comprising the steps of:
   (a) staging the sample on a fine adjustment stage;
   (b) vibrating a vibrator mechanically coupled to a cantilever;
   (c) detecting a deflection of the cantilever caused by the sample;
   (d) outputting a control signal, based on the deflection of the cantilever, to the fine adjustment stage and a piezoelectric actuator, wherein the piezoelectric actuator is arranged on the cantilever; and
   (e) moving the fine adjustment stage and the piezoelectric actuator in order to trace the surface shape of the sample.

10. A method for scanning according to claim 9, wherein the control signal comprises a high-frequency component and a low-frequency component.

11. A method for scanning according to claim 10, wherein the high-frequency component controls the piezoelectric actuator, and the low-frequency component controls the fine adjustment stage.

12. A method for scanning according to claim 9, the method further comprising the step of displaying the surface shape of the sample.

13. A method for scanning according to claim 9, wherein the step of detecting a deflection of the cantilever further comprises:
   (c1) emitting a light beam toward the cantilever in order to cause a reflection of the light beam from the cantilever; and
   (c2) detecting a position of the reflected light beam.

14. A method for scanning according to claim 9, wherein the step of detecting a deflection of the cantilever further comprises detecting a deflection using a piezoelectric strain detector arranged on the cantilever.

* * * * *